United States Patent
Nilsson et al.

(10) Patent No.: US 11,265,112 B2
(45) Date of Patent: Mar. 1, 2022

(54) ENHANCED POLLING PROCEDURES

(71) Applicant: Intel Corporation

(72) Inventors: Magnus Nilsson, Umea (SE); Marcin Potorski, Szczecin (PL); Jose Cesares Cano, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/649,993

(22) PCT Filed: Nov. 30, 2017

(86) PCT No.: PCT/EP2017/080979
§ 371 (c)(1),
(2) Date: Mar. 24, 2020

(87) PCT Pub. No.: WO2019/105553
PCT Pub. Date: Jun. 6, 2019

(65) Prior Publication Data
US 2021/0058194 A1 Feb. 25, 2021

(51) Int. Cl.
*H04L 1/16* (2006.01)
*H04W 76/25* (2018.01)
(Continued)

(52) U.S. Cl.
CPC .......... *H04L 1/1685* (2013.01); *H04W 76/25* (2018.02); *H04W 80/02* (2013.01); *H04W 80/08* (2013.01)

(58) Field of Classification Search
USPC ...................................................... 370/329
See application file for complete search history.

(56) References Cited

U.S. PATENT DOCUMENTS

| | | | | |
|---|---|---|---|---|
| 8,369,854 B2 * | 2/2013 | Peisa | ...................... | H04W 36/26 455/436 |
| 8,619,752 B2 * | 12/2013 | Meylan | ................. | H04L 1/1867 370/346 |

(Continued)

FOREIGN PATENT DOCUMENTS

| | | |
|---|---|---|
| EP | 2211579 A1 | 7/2010 |
| WO | 2015012654 A1 | 1/2015 |
| WO | 2017076610 A1 | 5/2017 |

OTHER PUBLICATIONS

3rd Generation Partnership Project, "Further discussion on RLC-AM for NB-IOT", 3GPP TSG-RAN WG2 NB-IOT adhoc meeting, Jan. 19-21, 2016, 4 pages, 6.2, Budapest, Hungary.

(Continued)

*Primary Examiner* — Man U Phan
(74) *Attorney, Agent, or Firm* — Viering, Jentschura & Partner mbB

(57) ABSTRACT

A device for wireless communications includes one or more protocol processors for executing a protocol stack, the one or more protocol processors configured to generate a first RLC (Radio Link Control) PDU (Protocol Data Unit) with data from a first upper-layer PDU and transmit the first RLC PDU to a counterpart base station RLC, generate a second RLC PDU, with its poll bit set, with data from a second upper-layer PDU and transmit the second RLC PDU to the counterpart base station RLC, and receive a status PDU from the counterpart base station RLC that indicates a status of the first and second RLC PDUs.

17 Claims, 8 Drawing Sheets

(51) Int. Cl.
*H04W 80/02* (2009.01)
*H04W 80/08* (2009.01)

(56) References Cited

U.S. PATENT DOCUMENTS

| | | | | |
|---|---|---|---|---|
| 9,674,832 | B2* | 6/2017 | Kim | H04W 28/06 |
| 9,936,423 | B2* | 4/2018 | Pani | H04L 47/27 |
| 9,999,016 | B2* | 6/2018 | Yi | H04L 1/1685 |
| 10,681,728 | B2* | 6/2020 | Lee | H04W 80/02 |
| 10,834,673 | B2* | 11/2020 | Martin | H04W 52/0216 |
| 2008/0225824 | A1 | 9/2008 | Meylan et al. | |
| 2009/0103445 | A1* | 4/2009 | Sammour | H04L 1/1887 370/252 |
| 2009/0225743 | A1 | 9/2009 | Nicholls et al. | |
| 2015/0245214 | A1* | 8/2015 | Bellam | H04L 9/0891 455/411 |
| 2015/0334553 | A1* | 11/2015 | Yang | H04W 36/0088 455/552.1 |
| 2016/0219458 | A1* | 7/2016 | Kubota | H04W 28/0273 |
| 2017/0093540 | A1 | 3/2017 | Lei et al. | |
| 2017/0094560 | A1 | 3/2017 | Pani et al. | |
| 2017/0237584 | A1 | 8/2017 | Yan et al. | |
| 2017/0265156 | A1 | 9/2017 | Xue et al. | |
| 2017/0311250 | A1 | 10/2017 | Rico Alvarino et al. | |
| 2017/0317816 | A1 | 11/2017 | Lei et al. | |
| 2017/0332357 | A1 | 11/2017 | Xu et al. | |
| 2018/0352601 | A1* | 12/2018 | Park | H04L 5/0055 |
| 2020/0154306 | A1* | 5/2020 | Jeon | H04W 56/009 |

OTHER PUBLICATIONS

International Search Report issued for corresponding PCT-Application No. PCT/EP2017/080979, dated Aug. 6, 2018, 3 pages (only for informational purpose only).
3rd Generation Partnership Project, "LTE; Evolved Universal Terrestrial Radio Access (E-UTRA); Radio Link Control (RLC) protocol specification", Apr. 2017, 48 pages, 3GPP TS 36.322, version 13.3.0, Release 13.
3rd Generation Partnership Project, "Universal Mobile Telecommunications System (UMTS); LTE; Non-Access-Stratum (NAS) protocol for Evolved Packet System (EPS); Stage 3", Mar. 2017, 459 pages, 3GPP TS 24.301, version 13.9.0, Release 13.
3rd Generation Partnership Project, "LTE; General Packet Radio Service (GPRS) enhancements for Evolved Universal Terrestrial Radio Access Network (E-UTRAN) access", Jan. 2017, 376 pages, 3GPP TS 23.401, version 13.9.0, Release 13.
Nokia et al., "On coverage level selection related matters", 8.24.2.1, Nov. 14-18, 2016, 1 page, R4-1609827, 3 GPP TSG-RAN WG4 3rd #81, Reno, USA.
Nokia et al., "Aspects for supporting low power UE", 6.2.9.5, Nov. 14-18, 2016, 3 pages, R1-1611312, 3 GPP TSG-RAN WG1 Meeting #87, Reno, USA.
Huawei et al., "NB-IOT—Coverage Class Decision and Adaption", 07.16.3.2, Oct. 5-9, 2015, 3 pages, R2-154513, 3 GPP TSG-RAN WG2 #91BIS, Malmo, Sweden.
Sriharsha, M. R. et al., "A complete cell search and synchronization in LTE", EURASIP Journal on Wireless Communications and Networking, May 31, 2017, 14 pages, 101(2017), Springer.
3rd Generation Partnership Project, "Technical Specification Group Radio Access Network, Evolved Universal Terrestrial Radio Access (E-UTRA), Physical channels and modulation", Mar. 2017, 171 pages, 3GPP TS 36.211 V13.5.0, Release 13.
Qualcom Incorporated, "NB-PSS and NB-SSS Design", 2.2.5, Mar. 22-24, 2016, 25 pages, R1-161936, 3GPP TSG RAN WG1 NB-IoT Ad-Hoc Meeting, Sophia Antipolis, France.
3rd Generation Partnership Project, "Technical Specification Group Radio Access Network, Evolved Universal Terrestrial Radio Access (E-UTRA), Radio Resource Control (RRC), Protocol specification", Mar. 2017, 638 pages, 3GPP TS 36.331 V13.5.0, Release 13.
3rd Generation Partnership Project, "Technical Specification Group Radio Access Network, Evolved Universal Terrestrial Radio Access (E-UTRA), Physical layer procedures", Mar. 2017, 387 pages, 3GPP TS 36.213 V13.5.0, Release 13.
3rd Generation Partnership Project, "Technical Specification Group Radio Access Network, Evolved Universal Terrestrial Radio Access (E-UTRA), Medium Access Control (MAC) protocol specification", Mar. 2017, 93 pages, 3GPP TS 36.321 V13.5.0, Release 13.
Huawei et al., "Synchronization signal evaluation", 2.1.1.4, Jan. 18-20, 2016, 7 pages, R1-160021, 3GPP TSG RAN WG1 NB-IoT Ad-Hoc Meeting, Budapest, Hungary.
3rd Generation Partnership Project, Technical Specification Group Radio Access Network, Evolved Universal Terrestrial Radio Access (E-UTRA), User Equipment (UE), radio transmission and reception, Mar. 2017, 1151 pages, 3GPP TS 36.101 V13.7.0, Release 13.
ETSI, LTE, Evolved Universal Terrestrial Radio Access (E-UTRA), User Equipment (UE) procedures in idle mode, Apr. 2017, 50 pages, ETSI TS 136.304 version 13.5.0.
Qualcom Incorporated, "NB-PSS and NB-SSS Design (Revised)", 2.2.5, Mar. 22-24, 2016, 26 pages, R1-161981, 3GPP TSG RAN WG1 NB-IoT Ad-Hoc Meeting, Sophia Antipolis, France.
Notice of Allowance mailed for U.S. Appl. No. 16/650,877 dated Jun. 18, 2021, 10 p.p (for informational purposes only).

* cited by examiner

ENHANCED POLLING PROCEDURES

CROSS-REFERENCE TO RELATED APPLICATIONS

This application is a national stage entry, according to 35 U.S.C. § 371, of PCT Application No. PCT/EP2017/080979 filed on Nov. 30, 2017, which is incorporated by reference herein in its entirety.

TECHNICAL FIELD

Various aspects relate generally to methods and devices for enhanced polling procedures.

BACKGROUND

3$^{rd}$ Generation Partnership Project (3GPP) radio access technologies such as Long Term Evolution (LTE) include polling procedures between devices to determine whether data has been successfully transmitted. For example, per the LTE standard, the Radio Link Control (RLC) entity in the Access Stratum (AS) of the User Equipment (UE) transmits RLC Protocol Data Units (PDUs) to a counterpart RLC in an evolved NodeB (eNodeB). To determine whether the RLC PDUs were successfully received at the eNodeB RLC, the UE RLC sets the poll bit in an RLC header (of an RLC PDU), which is then received at the eNodeB RLC. The eNodeB RLC responds by transmitting a Status PDU that indicates the status of the RLC PDUs, or in other words, specifies whether the RLC PDUs were successfully received or not. The UE RLC can then determine which RLC PDUs were not successfully received and should be retransmitted.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
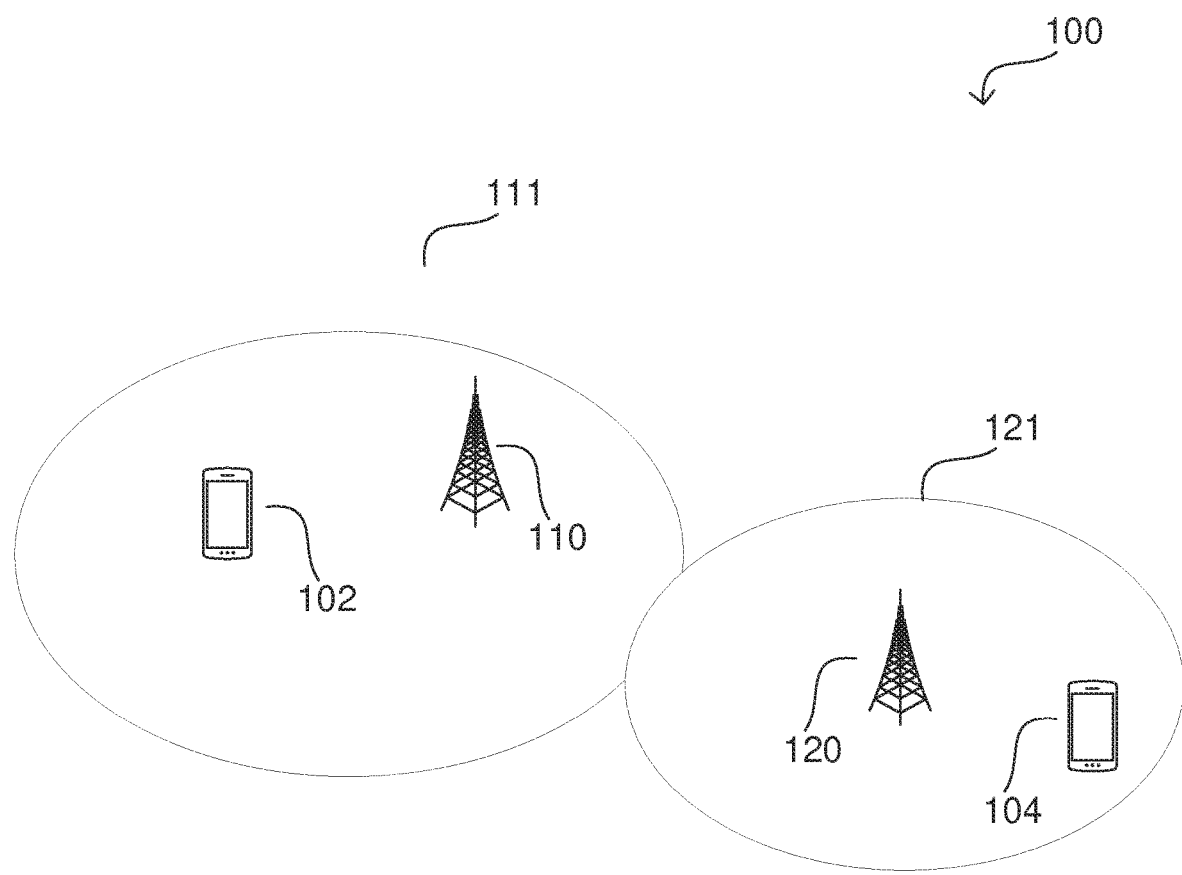
FIG. 1 shows an exemplary diagram of a radio communication network according to some aspects.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node.

Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Narrowband Internet of Things (NB-IoT) is a new cellular technology that was recently introduced by the 3GPP (Release 13). As specified by the 3GPP, NB-IoT provides an architecture for IoT devices to communicate using cellular resources, namely based around the existing LTE standard. As many IoT devices are expected to have relatively simple and support long lifetimes, major drivers of NB-IoT are low complexity and low power consumption.

Many of the targeted IoT devices are also expected to engage in small and infrequent data transfer (for example, a sensor providing short periodic sensing reports via a wireless link). However, various features of the existing LTE standard tailor it towards mobile broadband use, which involves much more frequent and traffic-heavy data usage (e.g., Voice over Internet Protocol (VoIP), multimedia streaming, etc.). Accordingly, while the existing LTE protocols are generally well-suited to these mobile broadband use cases, many aspects of LTE are not well-developed for the type of small and infrequent data usage expected in many IoT applications.

Recognizing this issue, the 3GPP has introduced features specifically tailored towards NB-IoT and other cellular IoT (CIoT) applications. One such feature is Control Plane CIoT Evolved Packet System (EPS) Optimization, which primarily targets the type of small and infrequent data transfer common to IoT devices. Conventional LTE data transfer is done via data radio bearers, which are able to handle heavy data traffic but require extra signaling for setup and maintenance. This added signaling makes data radio bearer-based transfer a suboptimal choice for IoT data transfer, as the extra signaling would need to be executed even when only infrequently transmitting small amounts of data. Accordingly, Control Plane CIoT EPS Optimization proposes to transfer user data over control plane signaling (versus over data radio bearers in the case of standard LTE). In particular, Control Plane CIoT EPS Optimization transports user data by encapsulating user data in Non-Access Stratum (NAS, which traditionally handles the interface between UE and MME) messages. These NAS messages are used in standard LTE for exchanging control signaling between terminal devices and the Mobility Management Entity (MME, a control node in the core network), and Control Plane CIoT EPS Optimization therefore re-purposes these control plane messages for transferring user plane data. A CIoT UE can therefore transfer small amounts of data by encapsulating and transmitting the data in NAS messages, which do not involve the extra signaling that is used for user data transfer over data radio bearers. Control Plane CIoT EPS Optimization consequently enables CIoT UEs to perform short data transactions without setting up or maintaining a data radio bearer, which in turn reduces complexity and power consumption.

While Control Plane CIoT EPS Optimization offers some advantages over traditional LTE data transfer, this disclosure recognizes that Control Plane CIoT EPS Optimization may nevertheless exhibit certain flaws. For example, when using Control Plane CIoT EPS Optimization, the UE NAS will send a NAS PDU containing user data to the UE AS. The various entities of the UE AS (e.g. Packet Data Convergence Protocol (PDCP), Radio Link Control (RLC), Media Access Control (MAC), and Physical layer (PHY)) will then respectively process the NAS PDU and transmit resulting Transport Blocks (TBs) to an eNodeB. Every time that the UE NAS sends a NAS PDU containing user data to the UE AS, the UE NAS will wait for acknowledgement from the lower layers of the UE AS before sending the next NAS PDU (with more user data) to the AS. The UE RLC (in the UE AS) may in particular be responsible for providing this acknowledgement to the UE NAS. Each time the UE RLC has transmitted an entire NAS PDU (in the form of one or more RLC PDUs), the UE RLC performs a polling procedure to determine whether the entire NAS PDU was successfully received at the eNodeB (e.g., whether the one or more RLC PDUs carrying the data of the NAS PDU were successfully received). To perform this polling procedure, the UE RLC sets the poll bit in an RLC header of an RLC PDU. When the counterpart eNodeB RLC sees that the poll bit is set, the eNodeB RLC prepares and transmits a Status PDU back to the UE RLC. This Status PDU indicates the status of each RLC PDU, or in other words, specifies whether each RLC PDU was transmitted received successfully at the eNodeB RLC or not. If the Status PDU indicates that all of the RLC PDUs carrying data of the NAS PDU were transmitted successfully, the UE RLC signals an acknowledgement back to the UE NAS. The UE NAS can then release the NAS PDU (for example, discard the data) and provide the next NAS PDU to the AS for transmission.

Per the LTE standard, the UE RLC is configured to set the poll bit when the RLC transmission buffer is empty (no upper-layer PDUs remaining in the RLC transmission buffer). If the NAS awaits acknowledgement from the AS before transmitting the next NAS PDU, this will lead to polling after each entire NAS PDU ("ESM DATA TRANSPORT" message) is transmitted over the air interface. However, this process of polling for a Status PDU consumes time and constitutes added overhead to the data transmission process in the UE. Accordingly, despite its advantages, Control Plane CIoT EPS Optimization still suffers from certain suboptimal features.

Various aspects of this disclosure therefore provide an alternate and enhanced polling scheme. In some cases, these aspects can avoid the time and overhead drawbacks of standardized Control Plane CIoT EPS Optimization, and can therefore be an attractive option for various CIoT use cases.

Figure 2:
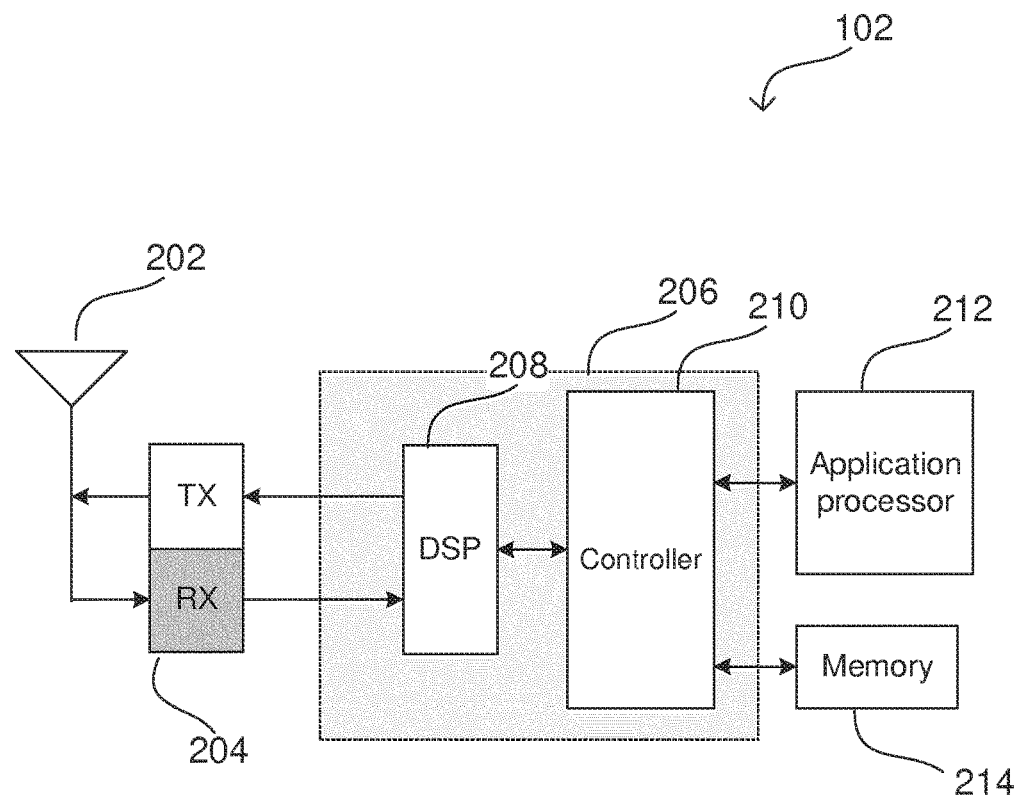
FIG. 2 shows an exemplary internal configuration of a terminal device according to some aspects.

While these aspects are presented within the framework of Control Plane CIoT EPS Optimization, the features of these aspects can readily be incorporated into numerous other signaling protocols, including 3GPP and non-3GPP standards. FIGS. 1 and 2 depict the general underlying network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the RF transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions of the radio communication technologies, while controller 210 may be responsible for upper-layer protocol stack functions. Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
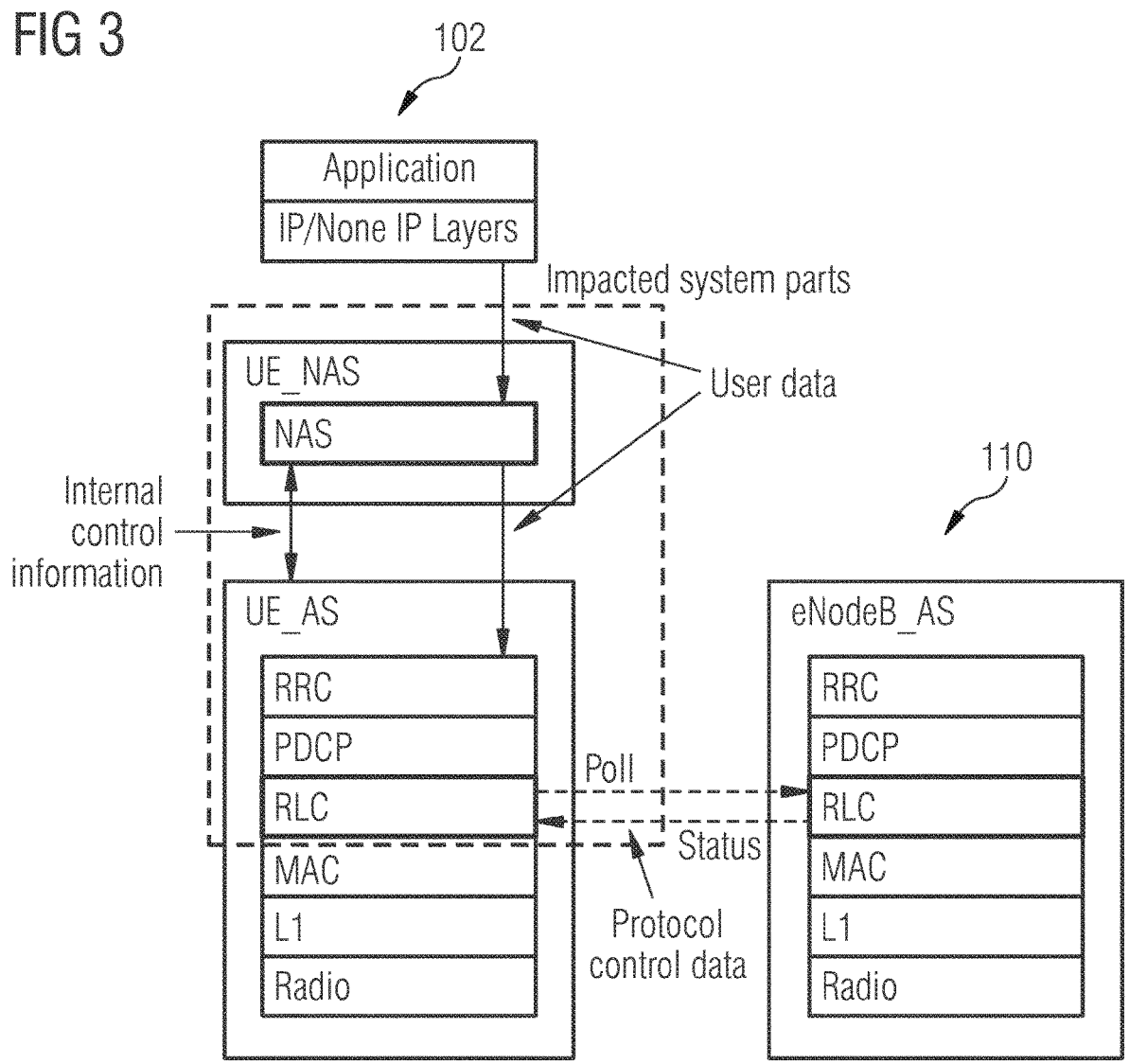
FIG. 3 shows an exemplary diagram of the network layers of a terminal device and a network access node according to some aspects.

In some aspects, terminal device 102 may be configured to perform polling procedures for uplink data transmitted to a network access node, such as network access node 110. Accordingly, the protocol stack executed by controller 210 of terminal device 102 may include an entity (i.e., a protocol stack entity, such as one embodied by protocol stack software) configured to request polling from a counterpart entity in network access node 110 (e.g., at a protocol stack executed by a controller of network access node 110). FIG. 3 shows an exemplary diagram depicting the protocol stack entities involved in polling in an exemplary LTE use case (although these concepts may readily be implemented with other radio access technologies). As shown in FIG. 3, the UE RLC entity (of a protocol stack executed by controller 210 of terminal device 102) may request polling from the counterpart eNodeB RLC entity (of a protocol stack executed by a controller of network access node 110), namely by transmitting an RLC PDU with an RLC header having its poll bit set. The eNodeB RLC entity may respond by transmitting a Status PDU back to the UE RLC that indicates the status of recent RLC PDUs, such as by specifying whether each RLC PDU was received successfully at the eNodeB RLC or not.

In some aspects, terminal device 102 may be configured to transmit user data in control plane signaling messages. For example, terminal device 102 may be configured as CIoT UE, and may be configured to use Control Plane CIoT EPS Optimization to transmit user data with control plane signaling messages. Accordingly, terminal device 102 may have user data to transmit, such as user data provided by an application layer at application processor 212 of terminal device 102. Instead of establishing a new data radio bearer or using an established data radio bearer between terminal device 102 and network access node 110, terminal device 102 may provide the user data to the UE NAS (similarly of a protocol stack executed by controller 210 of terminal device 102), which may then transmit the user data via NAS messages. For example, as shown in FIG. 3, the application layer may provide user data to the IP layers (which may also be executed at application processor 212), which may then transfer the user data to the UE NAS. The UE NAS may then encapsulate the user plane data in a NAS PDU (e.g., a ("ESM DATA TRANSPORT" message). The UE NAS then provides the NAS PDU to the UE AS for transmission. The various entities of the UE AS may then perform processing and header encapsulation on the NAS PDU according to their respective entity-specific functions. This includes the UE RLC, which may generate one or more RLC PDUs (per NAS PDU) encapsulated by an RLC header. The UE RLC may pass these RLC PDUs (containing the user data of the NAS PDU) to the UE MAC layer below, which may generate transport blocks (TBs) that terminal device 102 subsequently transmits via the PHY layer (digital signal processor 208), RF transceiver 204, and antenna system 202.

As previously indicated, the UE RLC may be configured to perform polling by setting the poll bit of an RLC header. When it receives the RLC header with the set poll bit, the eNodeB RLC may respond by generating and transmitting a Status PDU that indicates the status of the RLC PDUs originally transmitted by the UE RLC. Upon receipt of the Status PDU, the UE RLC can determine which of the RLC PDUs for the NAS PDU were successfully transmitted and which were not.

As previously indicated, the LTE and CIoT standards may normally dictate that the UE RLC perform polling for each NAS PDU. The UE NAS may therefore wait until the UE AS has confirmed successful transmission of the last NAS PDU before providing another NAS PDU to the UE AS for transmission. As recognized by this disclosure, this polling process may be time consuming, and may also introduce excessive signaling overhead due to the repeated exchange of Status PDUs.

Accordingly, in some aspects terminal device 102 may be configured to perform an enhanced polling procedure provided by this disclosure. As will be detailed, in some aspects the UE RLC may be configured to concurrently perform polling for a sequence of NAS PDUs. Accordingly, instead of performing polling for each NAS PDU to get the status of each corresponding RLC PDU, the UE RLC can be configured to perform polling for multiple NAS PDUs at a time. The UE NAS may therefore not wait to receive a successfully transmission acknowledgement from the UE RLC for the last NAS PDU, and instead may provide the next NAS PDU to the UE RLC before any such successful transmission acknowledgement (e.g., ACK) is received. In addition to being more time efficient, this enhanced polling procedure may reduce overhead, as polling for multiple NAS PDUs can be performed together with a single Status PDU instead of separately with multiple individual Status PDUs.

Figure 4:
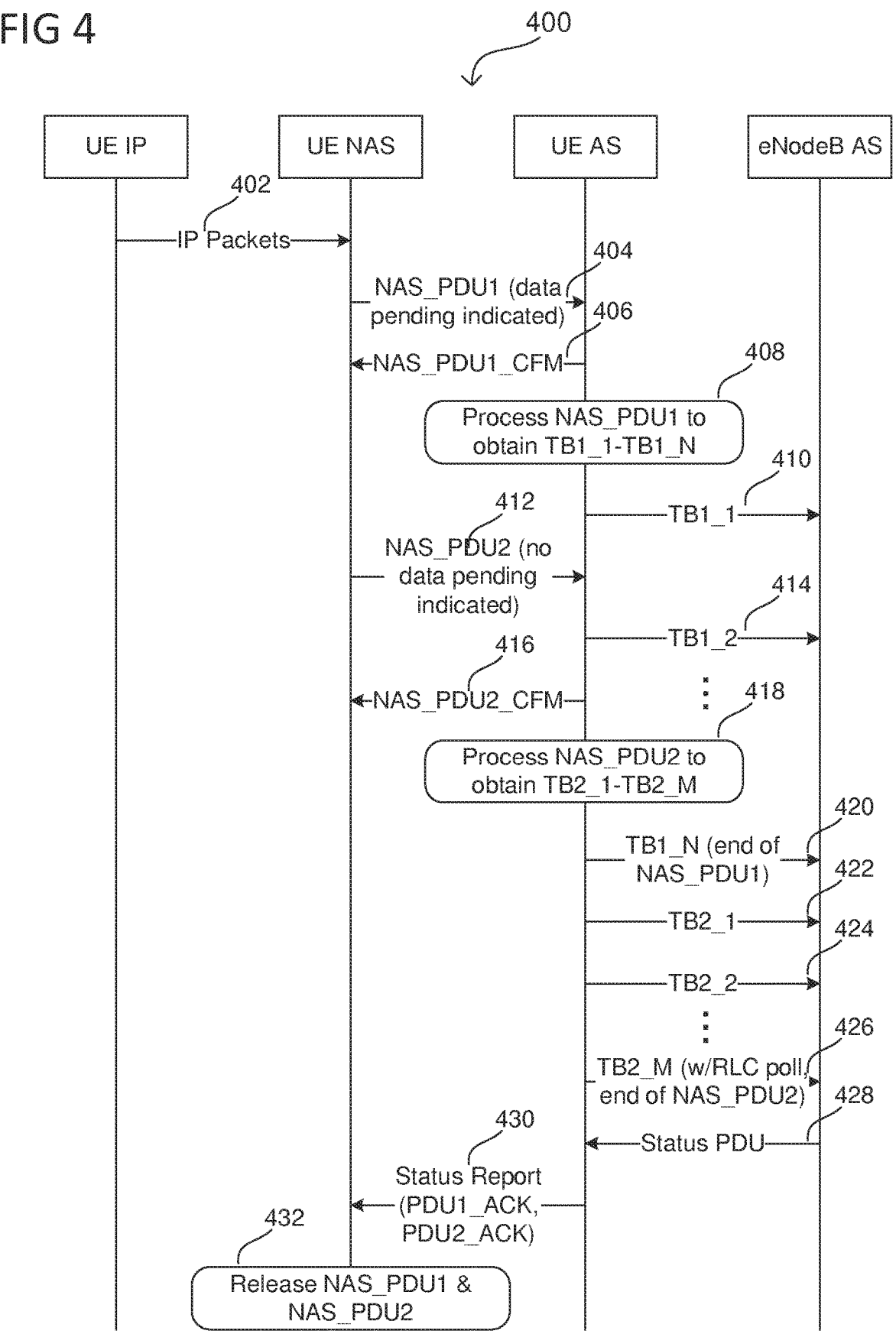
FIG. 4 shows an exemplary message sequence chart describing an enhanced polling procedure according to some aspects.

FIG. 4 shows exemplary message sequence chart 400 illustrating the enhanced polling procedure according to some aspects. As shown in FIG. 4, the UE IP layer (e.g., running as software on application processor 212 of terminal device 102) may provide IP packets to the UE NAS (e.g., running as protocol stack software on controller 210 of terminal device 102) in stage 402. For example, in the exemplary scenario of FIG. 4, the UE IP layer may provide two IP packets to the UE NAS (although this number is scalable to any amount). The UE NAS may then encapsulate the IP packets with a NAS header to produce NAS PDUs (e.g., two NAS PDUs, one per IP packet).

The UE NAS may then provide the NAS PDUs to the UE AS (e.g., running as protocol stack software on controller 210). As shown in FIG. 4, the UE NAS may provide the first NAS PDU (NAS_PDU1) to the UE AS in stage 404 (as also depicted by the "User data" flow between UE_NAS and UE_AS in FIG. 3). In some aspects, the UE NAS may also indicate to the UE AS whether there is further pending NAS data, e.g., whether or not there are further NAS PDUs at the UE NAS pending transmission. In the exemplary scenario of FIG. 4, the UE NAS may indicate that there is pending data (e.g., via "Internal control information" as shown in FIG. 3). The UE AS can therefore determine that there are further NAS PDUs that will be subsequently provided to the UE AS.

As shown in FIG. 4, the UE AS may respond to the UE NAS with a confirmation message (NAS_PDU1_CFM) confirming receipt of the first PDU in stage 406 (e.g., via the "Internal control information"). In some aspects, the UE PDCP entity, which may be the highest UE AS entity, may provide the confirmation message to the UE NAS for the first PDU.

The UE AS may then process the first NAS PDU according to each of its respective protocol stack entities (e.g., PDCP, RLC, MAC) in stage 408 to obtain transport blocks (TB1_1-TB1_N; N transport blocks in total) that contain the data from the first NAS PDU. Although not explicitly shown in FIG. 4, this may include the UL RLC entity of the UE AS processing the RLC SDUs (e.g., provided from the above UE PDCP entity) to produce RLC PDUs. The UE AS may then begin transmitting the transport blocks to network access node 110 (e.g., to a counterpart eNodeB AS running as protocol stack software on a controller of network access node 110). As shown in FIG. 1, the LT AS may transmit the first transport block for the first NAS PDU (TB1_1), in stage 410, the second transport block (TB1_2) in stage 414, and so forth until the last transport block (TB1_N) in stage 420. The timing of these stages relative to the other concurrent actions in message sequence chart 400 is exemplary, and their occurrence relative to stages 412, 416, and 418 may be different from that shown in FIG. 4.

As terminal device 102 is using the enhanced polling procedure, the UE NAS may not wait to receive a successful transmission acknowledgement from the UE AS before providing the next NAS PDU (NAS_PDU2) to the UE AS (in other words, may provide a next NAS PDU to the UE AS before an acknowledgement is received from the UE for a previous NAS PDU). Accordingly, as shown in FIG. 4, the NAS PDU may provide this second NAS PDU to the UE AS in stage 412. In the exemplary scenario of FIG. 4, this may be last NAS PDU that is currently pending at the UE NAS, and the UE NAS may also indicate that no further data is pending at the UE NAS. The UE AS may then confirm receipt of the second NAS PDU in stage 416, and then proceed to process the second NAS PDU to obtain transport blocks (TB2_1-TB2_M; M transport blocks in total).

The UE AS may then begin transmitting the transport blocks for the second NAS PDU in stage 422 (e.g., after transmission of the transport blocks for the first NAS PDU are finished in stage 420; alternatively, the UE AS could interleave this transmission between transport blocks for the first NAS PDU and the transport blocks for the second NAS PDU). As shown in FIG. 4, the UE AS may transmit the transport blocks (M in total) in stages 422-426, with the final transport block for the second NAS PDU (TB2_M) transmitted in stage 426.

As indicated at stage 426 in FIG. 4, the UE AS may transmit the last transport block for the second NAS PDU with the RLC poll bit set (e.g., the UE RLC may set the poll bit in the RLC header for the last RLC PDU for the NAS PDU). The eNodeB AS (e.g., the eNodeB RLC) may detect that the RLC poll bit is set when it receives this transport block, and may respond with a Status PDU in 428. The Status PDU may indicate the status of the recently transmitted RLC PDUs (e.g., a single PDU that indicates the status of multiple RLC PDUs). In the exemplary scenario of FIG. 4, the Status PDU may indicate that all of the RLC PDUs for the first and second NAS PDUs were successfully received at the eNodeB AS. Accordingly, the UE AS (UE RLC) may receive the Status PDU and determine that the first and second NAS PDUs were successfully transmitted. The UE AS may therefore send a Status Report to the UE NAS in stage 430 that indicates that the first and second NAS PDUs were successfully transmitted, e.g., may transmit a successful transmission acknowledgement to the UE NAS for the first and second NAS PDUs. The UE NAS may then release the first and second NAS PDUs in stage 432 (e.g., may discard the data). In other scenarios where one or more of the NAS PDUs were not successfully received (e.g., where the Status PDU indicates that one or more transport blocks carrying data of the NAS PDU were not successfully received at the eNodeB AS), the UE AS may report a transmission failure (NACK) for the one or more failed NAS PDUs to the UE NAS. The UE AS may then retransmit the one or more failed NAS PDUs.

Accordingly, the UE AS may be configured to not perform polling for each NAS PDU, and may instead perform joint polling for a sequence of NAS PDUs (e.g., where the UE AS receives a Status PDU giving the status of RLC PDUs carrying data from multiple NAS PDUs). By extension, the UE NAS may not wait until it receives a successful transmission acknowledgement from the UE AS for a NAS PDU before providing the next NAS PDU to the UE AS. Instead, the UE NAS may provide a next NAS PDU before receiving a successful transmission acknowledgement from the UE AS for a previous NAS PDU.

Figure 5:
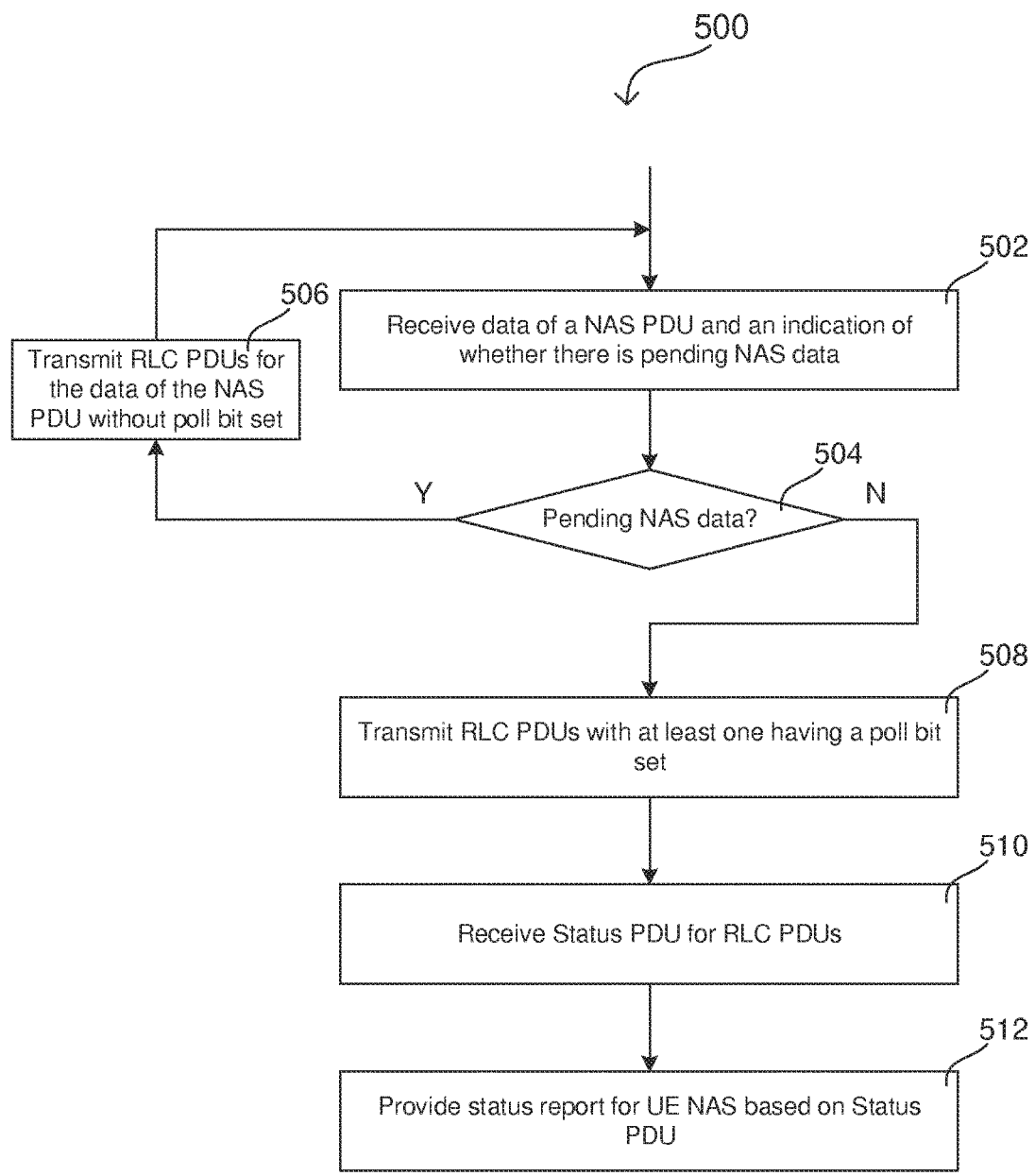
FIG. 5 shows a first exemplary decision chart describing an enhanced polling procedure according to some aspects.

In various aspects, the decision-making for the enhanced polling procedure may be handled at the UE RLC. FIG. 5 shows exemplary decision chart 500 for the UE RLC according to some aspects. Controller 210 of terminal device 102 may be configured to retrieve from a local memory and execute protocol stack software that defines the procedure of decision chart 500 as executable instructions.

As shown in FIG. 5, the UE RLC may first receive data of a NAS PDU from the UE NAS along with an indication of whether is pending NAS data in stage 502. In some aspects, the UE RLC may receive the data of the NAS PDU from the UE PDCP (e.g., as a PDCP PDU), where the PDCP may sit between the UE NAS and the UE RLC. The UE RLC may then determine in stage 504 whether there is pending NAS data based on the indication. If there is pending NAS data, the UE RLC may generate and transmit RLC PDUs (to the counterpart eNodeB RLC on the RLC-RLC interface, which includes passing the RLC PDUs to the lower layers in the UE AS, such as the MAC layer, for transmission as transport blocks) for the data of the NAS PDU without the poll bit set in stage 506. As there is pending NAS data, the UE RLC may return to stage 502 to receive data of another NAS PDU along with another indication of whether there is pending NAS data.

The UE RLC may repeat this procedure until there is no further pending NAS data (e.g., until it receives a NAS PDU from the UE NAS when there is no further pending NAS PDUs). Once there is no pending NAS data, the UE RLC may generate and transmit RLC PDUs (to the counterpart eNodeB RLC via the RLC-RLC interface) with at least one having a poll bit set in stage 508 (e.g., as in transport block TB2_M from FIG. 4). In some aspects, the UE RLC may set the poll bit in the final RLC PDU (e.g., last-occurring in time) that contains data of the NAS PDUs.

The counterpart eNodeB RLC at network access node 110 may then receive the RLC PDUs, including the at least one having its poll bit set. In response, the eNodeB RLC may generate and transmit a Status PDU, which the UE RLC may receive at stage 510. The UE RLC may then generate and provide a status report for the UE NAS based on the Status PDU in stage 512 (alternatively, in some aspects, the UE RLC may provide the Status PDU or information derived therefrom to the UE PDCP, which may generate and transmit the status report to the UE NAS). The status report may indicate whether each of the NAS PDUs was transmitted successfully or not. The NAS PDU may then release any NAS PDUs that were transmitted successfully. The UE RLC may retransmit and poll for any RLC PDUs that were not transmitted successfully, and report back to the UE NAS once they have been transmitted successfully (not explicitly shown in FIG. 5).

Accordingly, in the context of FIG. 5, the UE RLC may be configured to perform joint polling for a continuous sequence of NAS PDUs, or in other words, for a sequence of NAS PDUs that occurs without an interruption in pending NAS PDUs. Accordingly, the UE RLC may continue to generate RLC PDUs for data of NAS PDUs until the UE NAS informs the UE RLC that there is no pending NAS data (e.g., that the last NAS PDU was the final pending NAS PDU for the time being). Once the UE RLC receives the indication that there is no pending NAS data, the UE RLC may generate at least one RLC PDU having its poll bit set, and may therefore perform joint polling for the continuous sequence of NAS PDUs.

Figure 6:
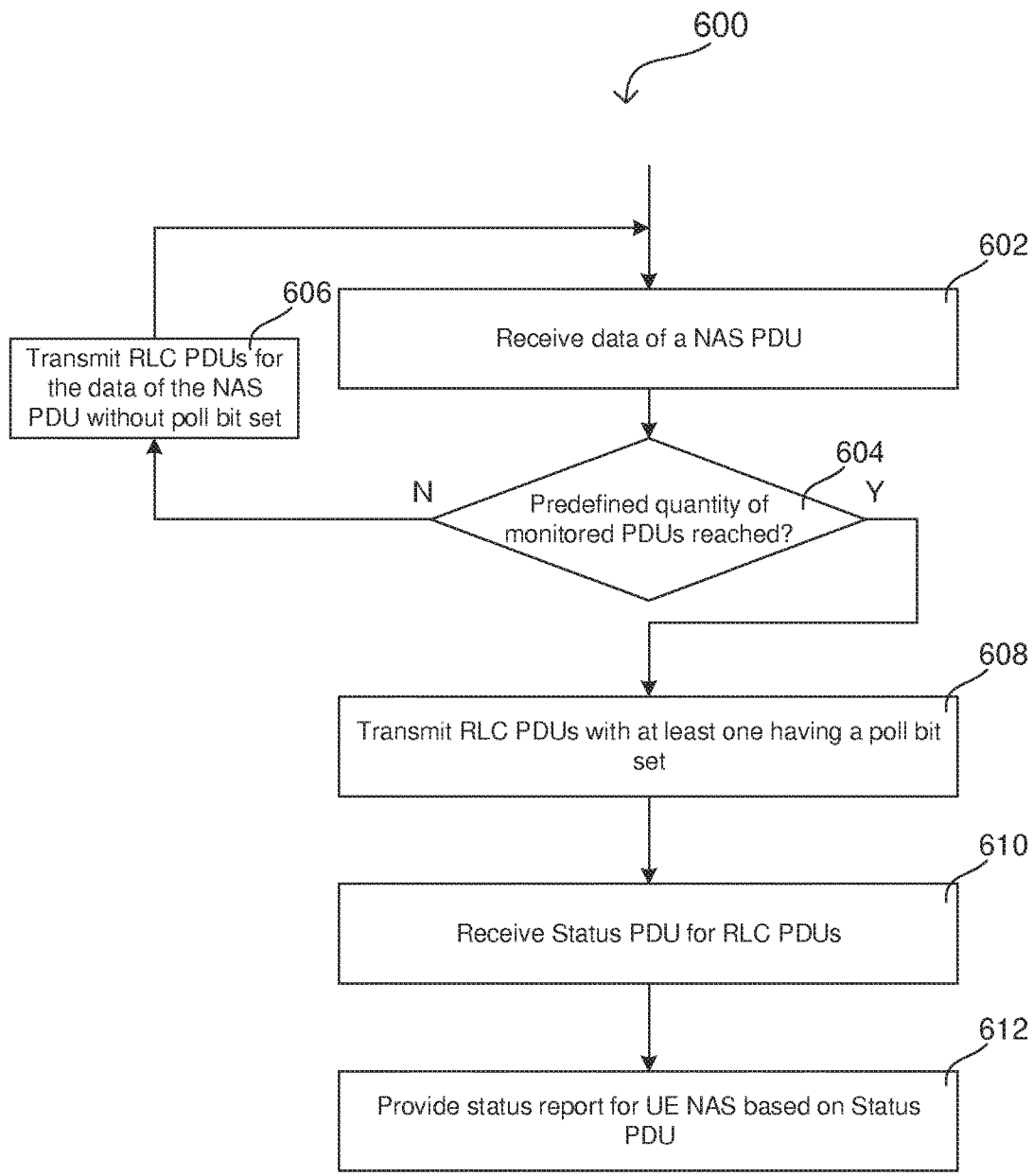
FIG. 6 shows a second exemplary decision chart describing an enhanced polling procedure according to some aspects.

FIG. 6 shows exemplary decision chart 600 for the UE RLC according to some aspects. Compared to decision chart 500, where the UE RLC performing joint polling for a continuous sequence of NAS PDUs (e.g., until there is no pending NAS data), decision chart 600 may configure a UE RLC to perform joint polling for a predefined quantity of PDUs (e.g., NAS, RLC, or PDCP PDUs). Accordingly, the UE RLC may receive data of a NAS PDU in stage 602 (which may or may not be accompanied by an indication of whether there is pending NAS data). The UE RLC may then determine whether a predefined quantity of monitored PDUs (e.g., PDUs of a certain type that are being monitored) has been reached since the last polling in stage 604. For example, if the predefined quantity of monitored PDUs is a predefined quantity of NAS PDUs, the UE RLC may be configured to keep a running count of the number of NAS PDUs that the UE RLC has generated RLC PDUs for. Similarly, if the predefined quantity of monitored PDUs is a predefined quantity of RLC PDUs, the UE RLC may be configured to keep a running count of the number of RLC PDUs that the UE RLC has generated for RLC PDUs (e.g., which may or may not include the RLC PDUs that will be generated from the data of the NAS PDU received in stage 602, which the UE RLC may be configured to determine or estimate based on the amount of data received in stage 602). If the predefined quantity of monitored PDUs is a predefined quantity of PDCP PDUs, the UE RLC may be configured to keep a running count of the number of PDCP PDUs that the UE RLC has received from the UE PDCP.

Accordingly, if the NAS PDU for which the UE RLC received data for in stage 602 brings the running count equal to the predefined quantity, the UE RLC may determine that the predefined quantity of monitored PDUs has been reached in stage 604 and may proceed to stage 608. Conversely, if the running count is still less than the predefined quantity of monitored PDUs, the UE RLC may proceed to stage 606 to transmit RLC PDUs for the data of the NAS PDU without the poll bit set. As previously described regarding stage 506, the UE RLC may transmit the RLC PDUs to the counterpart eNodeB RLC over the RLC-RLC interface, which includes passing the RLC PDUs to the lower UE AS layer for transmission in the form of transport blocks.

Once the running count reaches the predefined quantity of monitored PDUs, the UE RLC may transmit RLC PDUs with at least one having its poll bit set in stage 608. Accordingly, the UE RLC may be configured to perform joint polling for a predefined quantity of monitored PDUs. The UE RLC may receive a Status PDU from the counterpart eNodeB RLC in stage 610, which the UE RLC may use to generate a status report for the UE NAS in stage 612.

Therefore, in contrast to the decision-making approach of decision chart 500 in which the UE RLC performed joint polling for a continuous sequence of NAS PDUs, decision-making chart 600 may configure the UE RLC to perform joint polling for a predefined quantity of monitored PDUs. Once the running count hits the predefined quantity, the UE RLC may therefore perform polling and reset the count, thus performing joint polling for the next predefined quantity of monitored PDUs. Accordingly, even if there is, for example, a continuous sequence of NAS PDUs larger than the predefined quantity of NAS PDUs, the UE RLC may only perform joint polling for the predefined quantity of NAS PDUs at a time.

In other aspects, the UE RLC may be configured to use a hybrid decision-making approach that combines decision charts 500 and 600. For example, the UE RLC may be configured to send an RLC PDU with its poll bit set whenever either the running count hits the predefined quantity of PDUs or until there is no pending NAS data. Accordingly, the UE RLC may be configured to perform joint polling sometimes for continuous sequences of NAS PDUs and sometimes for predefined quantities of PDUs.

While various aspects described above are presented in the exemplary context of Control Plane CIoT EPS Optimization (where user data is transmitted in NAS PDUs), this is used as a helpful context in which to demonstrate the underlying concepts. Accordingly, in some aspects, terminal device 102 may implement this functionality for contexts other than Control Plane CIoT EPS Optimization, including non-LTE and non-3GPP use cases. For example, while the examples described above pertain to the UE NAS providing user data encapsulated in NAS PDUs and the UE RLC performing polling for this data, in other aspects the UE RLC may be configured to implement the enhanced polling procedure for standard user data (e.g., provided from the IP/transport layer instead of the UE NAS).

Figure 7:
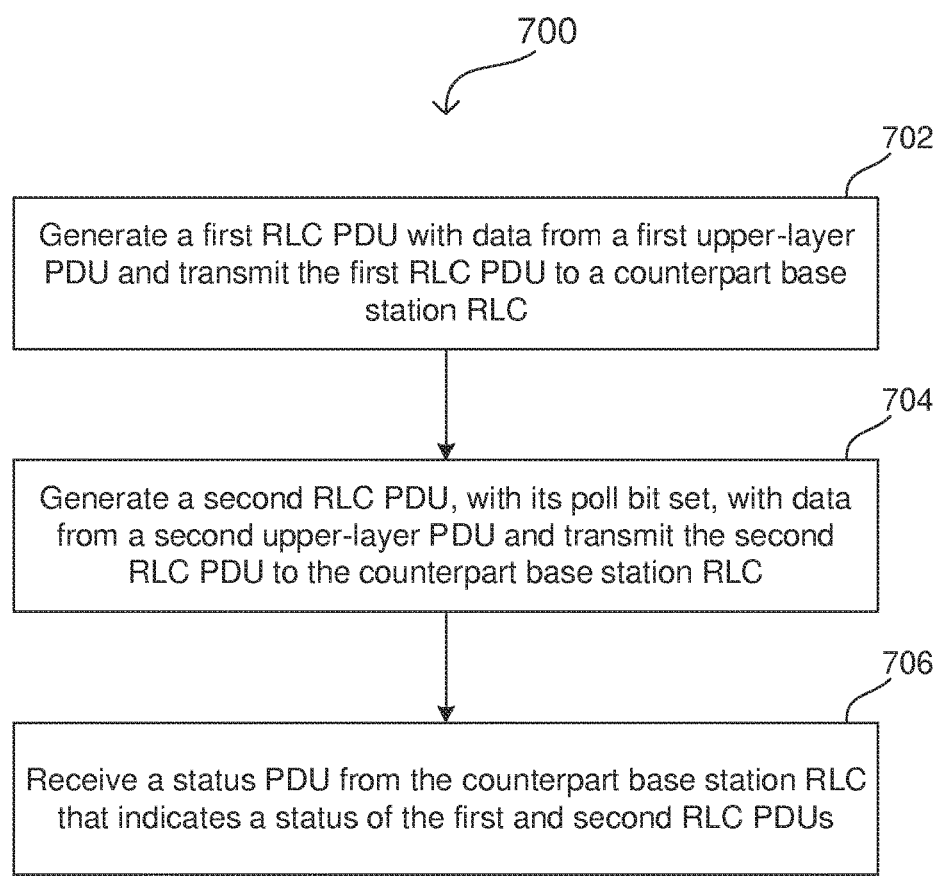
FIG. 7 shows a first exemplary method of performing wireless communications according to some aspects.

FIG. 7 shows exemplary method 700 of performing wireless communications according to some aspects. As shown in FIG. 7, method 700 includes generating a first RLC (Radio Link Control) PDU (Protocol Data Unit) with data from a first upper-layer PDU and transmitting the first RLC PDU to a counterpart base station RLC (stage 702), generating a second RLC PDU, with its poll bit set, with data from a second upper-layer PDU and transmitting the second RLC PDU to the counterpart base station RLC (stage 704), and receiving a status PDU from the counterpart base station RLC that indicates a status of the first and second RLC PDUs (stage 706).

Figure 8:
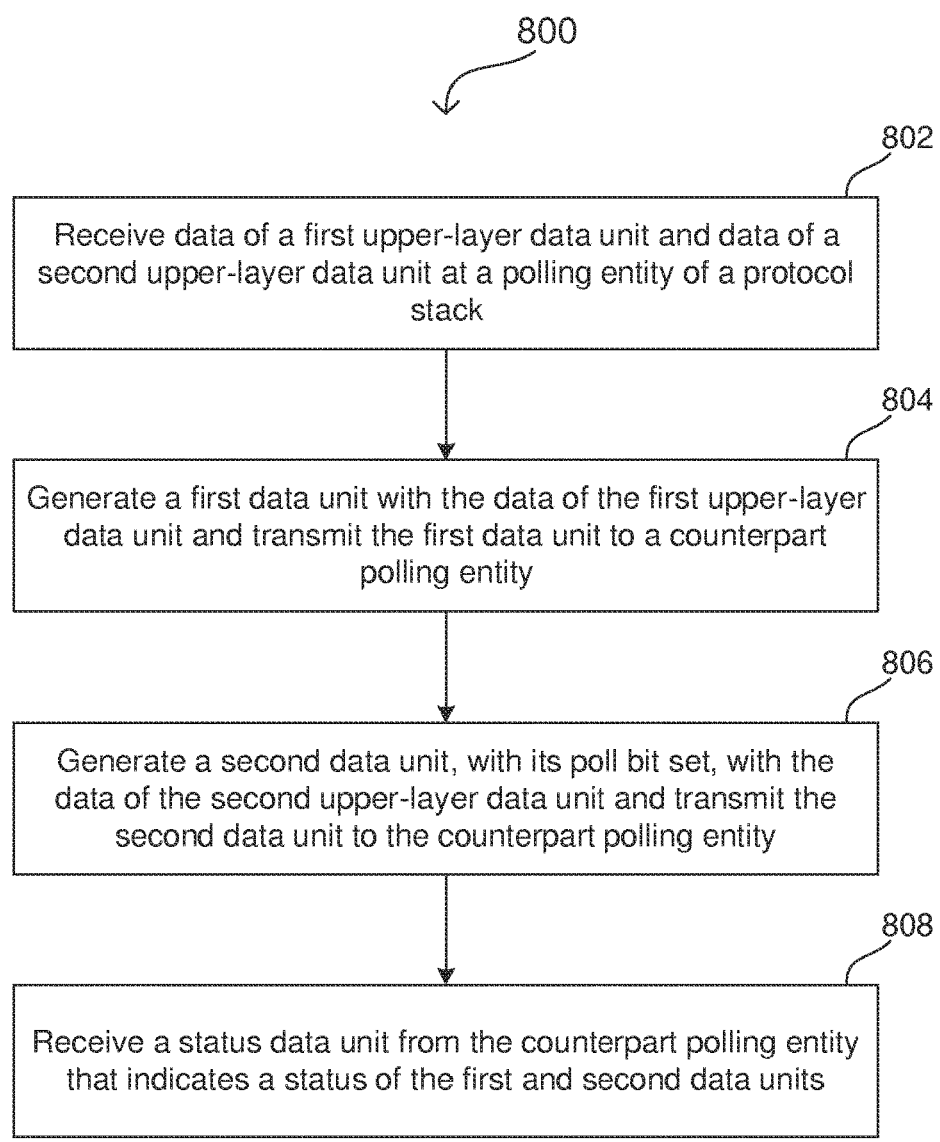
FIG. 8 shows a second exemplary method of performing wireless communications according to some aspects.

FIG. 8 shows method 800 of performing wireless communications according to some aspects. As shown in FIG. 8, method 800 includes receiving data of a first upper-layer data unit and data of a second upper-layer data unit at a polling entity of a protocol stack (stage 802), generating a first data unit with the data of the first upper-layer data unit and transmitting the first data unit to a counterpart polling entity (stage 804), generating a second data unit, with its poll bit set, with the data of the second upper-layer data unit and transmitting the second data unit to the counterpart polling entity (stage 806), and receiving a status data unit from the counterpart polling entity that indicates a status of the first and second data units (stage 808).

In some aspects of this disclosure, a device for wireless communications can include one or more protocol processors (e.g., controller 210 of terminal device 102, configured to execute a protocol stack including a UE RLC entity) for executing a protocol stack, the one or more protocol processors configured to generate a first RLC (Radio Link Control) PDU (Protocol Data Unit) with data from a first upper-layer PDU and transmit the first RLC PDU to a counterpart base station RLC, generate a second RLC PDU, with its poll bit set, with data from a second upper-layer PDU and transmit the second RLC PDU to the counterpart base station RLC, and receive a status PDU from the counterpart base station RLC that indicates a status of the first and second RLC PDUs. In some aspects, a device for wireless communications can include one or more protocol processors (e.g., controller 210 of terminal device 102, configured to execute a protocol stack including a UE RLC entity) for executing a protocol stack, the one or more protocol processors configured to receive data of a first upper-layer data unit and data of a second upper-layer data unit at a polling entity of a protocol stack, generate a first data unit with the data of the first upper-layer data unit and transmit the first data unit to a counterpart polling entity, generate a second data unit, with its poll bit set, with the data of the second upper-layer data unit and transmit the second data unit to the counterpart polling entity, and receive a status data unit from the counterpart polling entity that indicates a status of the first and second data units.

The following examples pertain to further aspects of this disclosure:

Example 1 is a method of performing wireless communications, the method including generating a first RLC (Radio Link Control) PDU (Protocol Data Unit) with data from a first upper-layer PDU and transmitting the first RLC PDU to a counterpart base station RLC, generating a second RLC PDU, with its poll bit set, with data from a second upper-layer PDU and transmitting the second RLC PDU to the counterpart base station RLC, and receiving a status PDU from the counterpart base station RLC that indicates a status of the first and second RLC PDUs.

In Example 2, the subject matter of Example 1 can optionally include that the first RLC PDU does not have its poll bit set.

In Example 3, the subject matter of Example 1 or 2 can optionally further include reporting the status of the first and second upper-layer PDUs to an upper-layer that provided them based on the status PDU.

In Example 4, the subject matter of Example 3 can optionally include that reporting the status of the first and second upper-layer PDUs to the upper-layer based on the status PDU includes determining, from the status PDU, whether the first and second RLC PDUs were successfully transmitted to the counterpart base station RLC, and sending a status report to the upper-layer.

In Example 5, the subject matter of any one of Examples 1 to 4 can optionally include that the first and second upper-layer PDUs are NAS (Non-Access Stratum) PDUs.

In Example 6, the subject matter of any one of Examples 1 to 5 can optionally further include generating the first and second upper-layer PDUs with user plane data.

In Example 7, the subject matter of any one of Examples 1 to 6 can optionally include that the first and second upper-layer PDUs are control plane signaling PDUs that include user plane data.

In Example 8, the subject matter of Example 7 can optionally include that the first and second upper-layer PDUs are NAS (Non-Access Stratum) PDUs for Control Plane CIoT (Cellular Internet of Things) EPS (Evolved Packet Service) Optimization.

In Example 9, the subject matter of any one of Examples 1 to 8 can optionally further include determining whether an upper-layer that provided the first and second upper-layer PDUs has pending data, and determining to set the poll bit of the second RLC PDU because the upper-layer does not have pending data.

In Example 10, the subject matter of Example 9 can optionally include that determining whether the upper-layer has pending data includes receiving an indication from the upper-layer that indicates whether the upper-layer has further pending upper-layer PDUs for transmission.

In Example 11, the subject matter of any one of Examples 1 to 8 can optionally further include tracking a number of monitored PDUs that have been transmitted since a previous RLC polling was performed, and determining to set the poll bit of the second RLC PDU because the number of monitored PDUs has reached a predefined quantity of monitored PDUs.

In Example 12, the subject matter of Example 11 can optionally include that the number of monitored PDUs is a number of upper-layer PDUs that have been transmitted as RLC PDUs since the previous RLC polling.

In Example 13, the subject matter of Example 11 can optionally include that the number of monitored PDUs is a number of RLC PDUs that have been transmitted since the previous RLC polling.

In Example 14, the subject matter of Example 11 can optionally include that the number of monitored PDUs is a number of Packet Data Convergence Protocol (PDCP) PDUs that have been received at an RLC entity generating the RLC PDUs.

In Example 15, the subject matter of any one of Examples 1 to 14 can optionally include that transmitting the first RLC PDU includes transmitting the first RLC PDU to the counterpart base station RLC over an RLC-RLC interface that uses wireless transmission to physically transfer the data.

In Example 16, the subject matter of any one of Examples 1 to 15 can optionally further include before generating and transmitting the first RLC PDU, generating and transmitting one or more additional RLC PDUs without set poll bits, where the status PDU also indicates a status of the one or more additional RLC PDUs.

In Example 17, the subject matter of any one of Examples 1 to 15 can optionally include that generating and transmitting the first and second RLC PDUs includes generating and transmitting RLC PDUs for a continuous sequence of upper-layer PDUs until an upper layer indicates that it has no pending data, where the second upper-layer PDU is the final upper-layer PDU in the continuous sequence of upper layer PDUs and the second RLC PDU is the final PDU of the RLC PDUs.

In Example 18, the subject matter of any one of Examples 1 to 15 can optionally include that generating and transmitting the first and second RLC PDUs includes tracking a number of monitored PDUs, generating and transmitting RLC PDUs until the number of monitored PDUs has reached a predefined quantity of monitored PDUs, where the second RLC PDU is the final PDU of the RLC PDUs.

Example 19 is a non-transitory computer readable medium storing instructions that when executed by a processor cause the processor to perform the method of any one of Examples 1 to 18.

Example 20 is a non-transitory computer readable medium storing instructions that when executed by a controller of a terminal device cause the terminal device to perform the method of any one of Examples 1 to 18.

Example 21 is a controller for a terminal device configured to retrieve and execute protocol stack software that causes the controller to perform the method of any one of Examples 1 to 20.

Example 22 is a method of performing wireless communications, the method including receiving data of a first upper-layer data unit and data of a second upper-layer data unit at a polling entity of a protocol stack, generating a first data unit with the data of the first upper-layer data unit and transmitting the first data unit to a counterpart polling entity, generating a second data unit, with its poll bit set, with the data of the second upper-layer data unit and transmitting the second data unit to the counterpart polling entity, and receiving a status data unit from the counterpart polling entity that indicates a status of the first and second data units.

In Example 23, the subject matter of Example 22 can optionally include that the polling entity is an RLC (Radio Link Control) entity of the protocol stack, the first and second data units are RLC PDUs (Protocol Data Units), and the status data unit is a Status PDU.

In Example 24, the subject matter of Example 22 or 23 can optionally include that the counterpart polling entity is a base station RLC (Radio Link Control) entity.

In Example 25, the subject matter of any one of Examples 22 to 24 can optionally include that the first data unit does not have a set poll bit.

In Example 26, the subject matter of any one of Examples 22 to 25 can optionally further include reporting the status of the first and second upper-layer data units to an upper-layer that provided them based on the status data unit.

In Example 27, the subject matter of Example 26 can optionally include that reporting the status of the first and second upper-layer data units includes determining, from the status data unit, whether the first and second data units were successfully transmitted to the counterpart polling entity, and sending a status report to the upper layer.

In Example 28, the subject matter of any one of Examples 22 to 27 can optionally further include generating the first and second upper-layer data units with user plane data.

In Example 29, the subject matter of any one of Examples 22 to 28 can optionally include that the first and second upper-layer data units are NAS (Non-Access Stratum) PDUs (Protocol Data Units).

In Example 30, the subject matter of any one of Examples 22 to 29 can optionally include that the first and second upper-layer data units are control plane signaling data units that include user plane data.

In Example 31, the subject matter of Example 30 can optionally include that the first and second upper-layer data units are NAS (Non-Access Stratum) PDUs (Protocol Data Units) for Control Plane CIoT (Cellular Internet of Things) EPS (Evolved Packet Service) Optimization.

In Example 32, the subject matter of any one of Examples 22 to 31 can optionally further include determining whether an upper-layer that provided the first and second upper-layer data units has pending data, and determining to set the poll bit of the second data unit because the upper-layer does not have pending data.

In Example 33, the subject matter of Example 32 can optionally include that determining whether the upper-layer has pending data includes receiving an indication from the upper-layer that indicates whether the upper-layer has further pending upper-layer data units for transmission.

In Example 34, the subject matter of any one of Examples 22 to 31 can optionally further include tracking a number of monitored data units that have been transmitted since a previous polling was performed by the polling entity, and determining to set the poll bit of the second data unit because the number of monitored data units has reached a predefined quantity.

In Example 35, the subject matter of Example 34 can optionally include that the monitored data units are RLC (Radio Link Control) PDUs (Protocol Data Units).

In Example 36, the subject matter of Example 34 can optionally include that the monitored data units are upper-layer PDUs (Protocol Data Units).

In Example 37, the subject matter of Example 34 can optionally include that the data units are PDCP (Packet Data Convergence Protocol) PDUs (Protocol Data Units).

In Example 38, the subject matter of any one of Examples 22 to 37 can optionally include that transmitting the first data unit includes transmitting the first data unit over a protocol stack-protocol stack interface that uses wireless transmission to physically transfer the data.

In Example 39, the subject matter of any one of Examples 22 to 38 can optionally further include before generating and transmitting the first data unit, generating and transmitting one or more additional data units without set poll bits, where the status data unit also indicates a status of the one or more additional data units.

In Example 40, the subject matter of any one of Examples 22 to 39 can optionally include that generating and transmitting the first and second data units includes generating and transmitting data units for a continuous sequence of upper-layer data units until an upper layer providing the upper-layer data units indicates that it has no pending data, where the second upper-layer data unit is the final upper-layer data unit in the continuous sequence of upper-layer data units and the second data is the final data unit of the data units.

In Example 41, the subject matter of any one of Examples 22 to 39 can optionally include that generating and transmitting the first and second data units includes tracking a number of monitored data units, generating and transmitting data units until the number of monitored data units has reached a predefined quantity of monitored data units, where the second data unit is the final data unit of the data units.

Example 42 is a non-transitory computer readable medium storing instructions that when executed by a processor cause the processor to perform the method of any one of Examples 22 to 41.

Example 43 is a non-transitory computer readable medium storing instructions that when executed by a controller of a terminal device cause the terminal device to perform the method of any one of Examples 22 to 41.

Example 44 is a controller for a terminal device configured to retrieve and execute protocol stack software that causes the controller to perform the method of any one of Examples 22 to 41.

Example 45 is a device for wireless communications, the device including one or more protocol processors for executing a protocol stack, the one or more protocol processors configured to generate a first RLC (Radio Link Control) PDU (Protocol Data Unit) with data from a first upper-layer PDU and transmit the first RLC PDU to a counterpart base station RLC, generate a second RLC PDU, with its poll bit set, with data from a second upper-layer PDU and transmit the second RLC PDU to the counterpart base station RLC, and receive a status PDU from the counterpart base station RLC that indicates a status of the first and second RLC PDUs.

In Example 46, the subject matter of Example 45 can optionally be configured as a baseband modem and further including a digital signal processor configured to perform PHY (physical layer) functions.

In Example 47, the subject matter of Example 45 or 46 can optionally be configured as a terminal device and further including one or more antennas and an RF (radio frequency) transceiver.

In Example 48, the subject matter of any one of Examples 45 to 47 can optionally include that the first RLC PDU does not have its poll bit set.

In Example 49, the subject matter of any one of Examples 45 to 48 can optionally include that the one or more protocol processors are further configured to report the status of the first and second upper-layer PDUs to an upper-layer that provided them based on the status PDU.

In Example 50, the subject matter of Example 49 can optionally include that the one or more protocol processors are configured to report the status of the first and second upper-layer PDUs to the upper-layer based on the status PDU by determining, from the status PDU, whether the first and second RLC PDUs were successfully transmitted to the counterpart base station RLC, and sending a status report to the upper-layer.

In Example 51, the subject matter of any one of Examples 45 to 50 can optionally include that the one or more protocol processors are further configured to generate the first and second upper-layer PDUs with user plane data.

In Example 52, the subject matter of any one of Examples 45 to 51 can optionally include that the first and second upper-layer PDUs are NAS (Non-Access Stratum) PDUs.

In Example 53, the subject matter of any one of Examples 45 to 52 can optionally include that the first and second upper-layer PDUs are control plane signaling PDUs that include user plane data.

In Example 54, the subject matter of Example 53 can optionally include that the first and second upper-layer PDUs are NAS (Non-Access Stratum) PDUs for Control Plane CIoT (Cellular Internet of Things) EPS (Evolved Packet Service) Optimization.

In Example 55, the subject matter of any one of Examples 45 to 54 can optionally include that the one or more protocol processors are further configured to determine whether an upper-layer that provided the first and second upper-layer PDUs has pending data, and determine to set the poll bit of the second RLC PDU because the upper-layer does not have pending data.

In Example 56, the subject matter of Example 55 can optionally include that the one or more protocol processors are configured to determine whether the upper-layer has pending data by receiving an indication from the upper-layer that indicates whether the upper-layer has further pending upper-layer PDUs for transmission.

In Example 57, the subject matter of any one of Examples 45 to 54 can optionally include that the one or more protocol processors are further configured to track a number of monitored PDUs that have been transmitted since a previous RLC polling was performed, and determine to set the poll bit of the second RLC PDU because the number of monitored PDUs has reached a predefined quantity of monitored PDUs.

In Example 58, the subject matter of Example 57 can optionally include that the number of monitored PDUs is a number of upper-layer PDUs that have been transmitted as RLC PDUs since the previous RLC polling.

In Example 59, the subject matter of Example 57 can optionally include that the number of monitored PDUs is a number of RLC PDUs that have been transmitted since the previous RLC polling.

In Example 60, the subject matter of Example 57 can optionally include that the number of monitored PDUs is a number of Packet Data Convergence Protocol (PDCP) PDUs that have been received at an RLC entity generating the RLC PDUs.

In Example 61, the subject matter of any one of Examples 45 to 60 can optionally include that the one or more protocol processors are configured to transmit the first RLC PDU by transmitting the first RLC PDU over an RLC-RLC interface that uses wireless transmission to physically transfer the data.

In Example 62, the subject matter of any one of Examples 45 to 61 can optionally include that the one or more protocol processors are further configured to before generating and transmitting the first RLC PDU, generate and transmit one or more additional RLC PDUs without set poll bits, that the status PDU also indicates a status of the one or more additional RLC PDUs.

In Example 63, the subject matter of any one of Examples 45 to 61 can optionally include that the one or more protocol processors are further configured to generate and transmit RLC PDUs for a continuous sequence of upper-layer PDUs until an upper layer indicates that it has no pending data, where the second upper-layer PDU is the final upper-layer PDU in the continuous sequence of upper layer PDUs and the second RLC PDU is the final PDU of the RLC PDUs.

In Example 64, the subject matter of any one of Examples 45 to 61 can optionally include that the one or more protocol processors are further configured to track a number of monitored PDUs, generate and transmit RLC PDUs until the number of monitored PDUs has reached a predefined quantity of monitored PDUs, where the second RLC PDU is the final PDU of the RLC PDUs.

Example 65 is a device for wireless communications, the device including one or more protocol processors for executing a protocol stack, the one or more protocol processors configured to receive data of a first upper-layer data unit and data of a second upper-layer data unit at a polling entity of a protocol stack, generate a first data unit with the data of the first upper-layer data unit and transmit the first data unit to a counterpart polling entity, generate a second data unit, with its poll bit set, with the data of the second upper-layer data unit and transmit the second data unit to the counterpart polling entity, and receive a status data unit from the counterpart polling entity that indicates a status of the first and second data units.

In Example 66, the subject matter of Example 65 can optionally be further configured as a baseband modem and further including a digital signal processor configured to perform PHY (physical layer) functions In Example 67, the subject matter of Example 65 or 66 can optionally be configured as a terminal device and further including one or more antennas and an RF (radio frequency) transceiver.

In Example 68, the subject matter of any one of Examples 65 to 67 can optionally include that the polling entity is an RLC (Radio Link Control) entity of the protocol stack, the first and second data units are RLC PDUs (Protocol Data Units), and the status data unit is a Status PDU.

In Example 69, the subject matter of any one of Examples 65 to 68 can optionally include that the counterpart polling entity is a base station RLC entity.

In Example 70, the subject matter of any one of Examples 65 to 69 can optionally include that the first data unit does not have a set poll bit.

In Example 71, the subject matter of any one of Examples 65 to 70 can optionally include that the one or more protocol processors are further configured to report the status of the first and second upper-layer data units to an upper-layer that provided them based on the status data unit.

In Example 72, the subject matter of Example 71 can optionally include that the one or more protocol processors are configured to report the status of the first and second upper-layer data units by determining, from the status data unit, whether the first and second data units were successfully transmitted to the counterpart polling entity, and sending a status report to the upper layer.

In Example 73, the subject matter of any one of Examples 65 to 72 can optionally include that the one or more protocol processors are configured to generate the first and second upper-layer data units with user plane data.

In Example 74, the subject matter of any one of Examples 65 to 73 can optionally include that the first and second upper-layer data units are NAS (Non-Access Stratum) PDUs (Protocol Data Units).

In Example 75, the subject matter of any one of Examples 65 to 74 can optionally include that the first and second upper-layer data units are control plane signaling data units that include user plane data.

In Example 76, the subject matter of Example 75 can optionally include that the first and second upper-layer data units are NAS (Non-Access Stratum) PDUs (Protocol Data Units) for Control Plane CIoT (Cellular Internet of Things) EPS (Evolved Packet Service) Optimization.

In Example 77, the subject matter of any one of Examples 65 to 76 can optionally include that the one or more protocol processors are further configured to determine whether an upper-layer that provided the first and second upper-layer data units has pending data, and determine to set the poll bit of the second data unit because the upper-layer does not have pending data.

In Example 78, the subject matter of Example 77 can optionally include that the one or more protocol processors are configured to determine whether the upper-layer has pending data by receiving an indication from the upper-layer that indicates whether the upper-layer has further pending upper-layer data units for transmission.

In Example 79, the subject matter of any one of Examples 65 to 78 can optionally include that the one or more protocol processors are further configured to track a number of monitored data units that have been transmitted since a previous polling was performed by the polling entity, and determine to set the poll bit of the second data unit because the number of data units of the certain type has reached a predefined quantity.

In Example 80, the subject matter of Example 79 can optionally include that the monitored data units being tracked are RLC (Radio Link Control) PDUs (Protocol Data Units).

In Example 81, the subject matter of Example 79 can optionally include that the monitored data units being tracked are upper-layer PDUs (Protocol Data Units).

In Example 82, the subject matter of Example 79 can optionally include that the data units are PDCP (Packet Data Convergence Protocol) PDUs (Protocol Data Units).

In Example 83, the subject matter of any one of Examples 65 to 82 can optionally include that the one or more protocol processors are configured to transmit the first data unit by transmitting the first data unit over a protocol stack-protocol stack interface that uses wireless transmission to physically transfer the data.

In Example 84, the subject matter of any one of Examples 65 to 83 can optionally include that the one or more protocol processors are further configured to before generating and transmitting the first data unit, generate and transmit one or more additional data units without set poll bits, where the status data unit also indicates a status of the one or more additional data units.

In Example 85, the subject matter of any one of Examples 65 to 84 can optionally include that the one or more protocol processors are configured to generate and transmit the first and second data units by generating and transmitting data units for a continuous sequence of upper-layer data units until an upper layer providing the upper-layer data units indicates that it has no pending data, where the second upper-layer data unit is the final upper-layer data unit in the continuous sequence of upper-layer data units and the second data is the final data unit of the data units.

In Example 86, the subject matter of any one of Examples 65 to 85 can optionally include that the one or more protocol processors are configured to generate and transmit the first and second data units by tracking a number of monitored data units, generating and transmitting data units until the number of monitored data units has reached a predefined quantity of monitored data units, where the second data unit is the final data unit of the data units.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device for wireless communications comprising one or more processors configured to:
    generate a first RLC (Radio Link Control) PDU (Protocol Data Unit) with data from a first upper-layer PDU and transmit the first RLC PDU to a counterpart base station RLC;
    generate a second RLC PDU, with its poll bit set to indicate to the counterpart base station RLC that the second RLC PDU is a final RLC PDU of a plurality of RLC PDUs comprising the first RLC PDU and the second RLC PDU, with data from a second upper-layer PDU and transmit the second RLC PDU to the counterpart base station RLC;
    receive a status PDU from the counterpart base station RLC that indicates a status of the first RLC PDU and the second RLC PDU in response to the counterpart base station RLC receiving the second RLC PDU; and
    report the status of the first and second upper-layer PDUs to an upper-layer that provided them based on the status PDU.

2. The device of claim 1, comprising a digital signal processor configured to perform PHY (physical layer) functions.

3. The device of claim 1, further comprising an interface to communicate with a radio frequency transceiver of a terminal device.

4. The device of claim 1, wherein the first RLC PDU does not have its poll bit set.

5. The device of claim 1, wherein the first and second upper-layer PDUs are NAS (Non-Access Stratum) PDUs.

6. The device of claim 1, wherein the first and second upper-layer PDUs are control plane signaling PDUs that comprise user plane data.

7. The device of claim 1, wherein the one or more processors are further configured to:
determine whether an upper-layer that provided the first and second upper-layer PDUs has pending data; and
determine to set the poll bit of the second RLC PDU based on the upper-layer not having pending data.

8. The device of claim 1, wherein the one or more processors are further configured to:
track a number of monitored PDUs that have been transmitted since a previous RLC polling was performed; and
determine to set the poll bit of the second RLC PDU based on the number of monitored PDUs reaching a predefined quantity of monitored PDUs.

9. The device of claim 1, wherein the one or more processors are further configured to:
before generating and transmitting the first RLC PDU, generate and transmit one or more additional RLC PDUs without set poll bits, wherein the status PDU also indicates a status of the one or more additional RLC PDUs.

10. The device of claim 1, wherein the one or more processors are further configured to:
generate and transmit RLC PDUs for a continuous sequence of upper-layer PDUs until an upper-layer indicates that it has no pending data, where the second upper-layer PDU is the final upper-layer PDU in the continuous sequence of upper-layer PDUs.

11. The device of claim 1, wherein the one or more processors are further configured to:
track a number of monitored PDUs; and
generate and transmit RLC PDUs until the number of monitored PDUs has reached a predefined quantity of monitored PDUs.

12. A device for wireless communications comprising one or more processors configured to:
receive data of a first upper-layer data unit and data of a second upper-layer data unit at a polling entity of a protocol stack;
generate a first data unit with the data of the first upper-layer data unit and transmit the first data unit to a counterpart polling entity;
generate a second data unit, with its poll bit set, with the data of the second upper-layer data unit and transmit the second data unit to the counterpart polling entity;
receive a status data unit from the counterpart polling entity that indicates a status of the first data unit and the second data unit; and
report the status of the first and second upper-layer data units to an upper-layer that provided them based on the status data unit.

13. The device of claim 12, comprising a digital signal processor configured to perform PHY (physical layer) functions.

14. The device of claim 12, further comprising an interface to communicate with a radio frequency transceiver of a terminal device.

15. The device of claim 12, wherein the first data unit does not have a set poll bit.

16. A method of performing wireless communications, the method comprising:
generating a first RLC (Radio Link Control) PDU (Protocol Data Unit) with data from a first upper-layer PDU and transmitting the first RLC PDU to a counterpart base station RLC;
generating a second RLC PDU, with its poll bit set, with data from a second upper-layer PDU and transmitting the second RLC PDU to the counterpart base station RLC;
receiving a status PDU from the counterpart base station RLC that indicates a status of the first RLC PDU and the second RLC PDU; and
reporting the status of the first and second upper-layer PDUs to an upper-layer that provided them based on the status PDU.

17. The method of claim 16, wherein the first RLC PDU does not have its poll bit set.

* * * * *